United States Patent [19]

Satomi

[11] Patent Number: 5,078,859
[45] Date of Patent: Jan. 7, 1992

[54] STOCK SCREENING APPARATUS

[75] Inventor: Hitoshi Satomi, Shizuoka, Japan

[73] Assignee: Satomi Seisakusho Co., Ltd., Shizuoka, Japan

[21] Appl. No.: 540,341

[22] Filed: Jun. 19, 1990

[30] Foreign Application Priority Data

Feb. 21, 1990 [JP] Japan ............... 2-16466[U]

[51] Int. Cl.$^5$ .............. B03B 7/00; D21D 5/00
[52] U.S. Cl. .................. 209/17; 209/255; 209/273
[58] Field of Search .......... 209/17, 211, 273, 270, 209/250, 44, 255

[56] References Cited

U.S. PATENT DOCUMENTS

| | | | |
|---|---|---|---|
| 3,586,172 | 6/1971 | Young | 209/273 X |
| 3,664,501 | 5/1972 | Cowan | 209/273 |
| 3,942,728 | 3/1976 | Christ et al. | 209/211 X |
| 4,017,387 | 4/1977 | Hatton | 209/273 X |
| 4,043,919 | 8/1977 | Hutzler | 209/273 X |
| 4,744,894 | 5/1988 | Gould | 209/273 X |
| 4,941,970 | 7/1990 | Ahs | 209/270 X |

FOREIGN PATENT DOCUMENTS 2548578  5/1977  Fed. Rep. of Germany ...... 209/273
0032594  8/1984  Japan ...................... 209/273

Primary Examiner—Donald T. Hajec
Attorney, Agent, or Firm—Kanesaka and Takeuchi

[57] ABSTRACT

A stock screening apparatus has a material supply port which communicates with a material supply passage, and a first discharge port which communicates with a first discharge passage. The first discharge passage is located within a downward projected image of the material supply passage. In consequence, the stock which flows into a primary chamber flows in a vortex along the periphery of the primary chamber, and the foreign materials contained in this vortex, such as stones or metals, can thus be discharged through the first discharge passage when they are moved to the first discharge port. Also, a rotary shaft of a drum-shaped rotary body is disposed horizontally. An opening of the portion of the primary chamber located downstream of the drum-shaped rotary body and that of the secondary chamber are closed by a cover. As a result, the opening of the portion of the primary chamber located downstream of the drum-shaped rotary body and that of the secondary chamber can be opened by removing the cover, and maintenance of the apparatus, such as washing with water, can be easily performed without removing the plate screen.

7 Claims, 5 Drawing Sheets

# STOCK SCREENING APPARATUS

BACKGROUND OF THE INVENTION

1. Field of the Invention

The present invention relates to a stock screening apparatus which is employed in the paper and pulp industries, and more particularly, to a stock screening apparatus in which a rotary shaft of a drum-shaped rotary body is disposed horizontally.

2. Description of the Related Art

Stock screening apparatus in which a fixed plate screen is disposed on a periphery of a rotor in such a manner as to be coaxial relative to the rotor is known (such apparatus being disclosed in, for example, Japanese Patent Laid-Open No. 164795/1989).

Since such stock screening apparatus has no mechanism for removing foreign materials on the upstream side of the rotor, foreign materials, such as stones or metals, may flow into a space between the rotor and the fixed plate screen, to thereby cause damaging of the rotor or the fixed plate screen and clogging of a part of the openings of the fixed plate screen. These greatly reduce the performance of the stock screening apparatus.

It has accordingly been proposed to provide a screening member upstream of the rotor and an impeller adjacent to the screening member. However, such provision increases the overall size of the equipment.

Also, in the stock screening apparatus of the above-described type, since the rotary shaft of the rotor is disposed vertically and the rotor has a height larger than its diameter, when a large apparatus is to be cleaned, the rotor or the cover must be separated from the apparatus body using an elevator or the like, to make cleaning a troublesome task.

SUMMARY OF THE INVENTION

An object of the present invention is to provide a stock screening apparatus which enables the foreign materials contained in a stock which flow into a primary chamber to be removed, and which is small in size.

The above-described object of the present invention is achieved by the provision of a stock screening apparatus in which a portion of a primary chamber located upstream of a drum-shaped rotary body has a cylindrical form, and in which a material supply port and a first discharge port are provided in a tangential direction of the circle of the cylindrical form. The material supply port communicates with the material supply passage, and the first discharge port communicates with the first discharge passage. The first discharge passage which communicates with the first discharge port is located within at a portion where the material supply passage which communicates with the material supply port in imaginarily projected downwardly. In consequence, the stock screening apparatus can be made small in size.

Another object of the present invention is to provide a stock screening apparatus which enables maintenance to be conducted without removal of a screen plate.

This object of the present invention is achieved by the provision of a stock screening apparatus in which a rotary shaft of a drum-shaped rotary body is disposed horizontally, in which a casing which forms a portion of a primary chamber located upstream of the drum-shaped rotary body is positioned on a driven side of the drum-shaped rotary body, and in which an opening of the portion of the primary chamber which is located on a side of the drum-shaped rotary body remote from the casing and downstream of the rotary body and that of the secondary chamber are closed by a cover.

DESCRIPTION OF THE PREFERRED EMBODIMENTS

An embodiment of the present invention will be described below with reference to the accompanying drawings.

Figure 1:
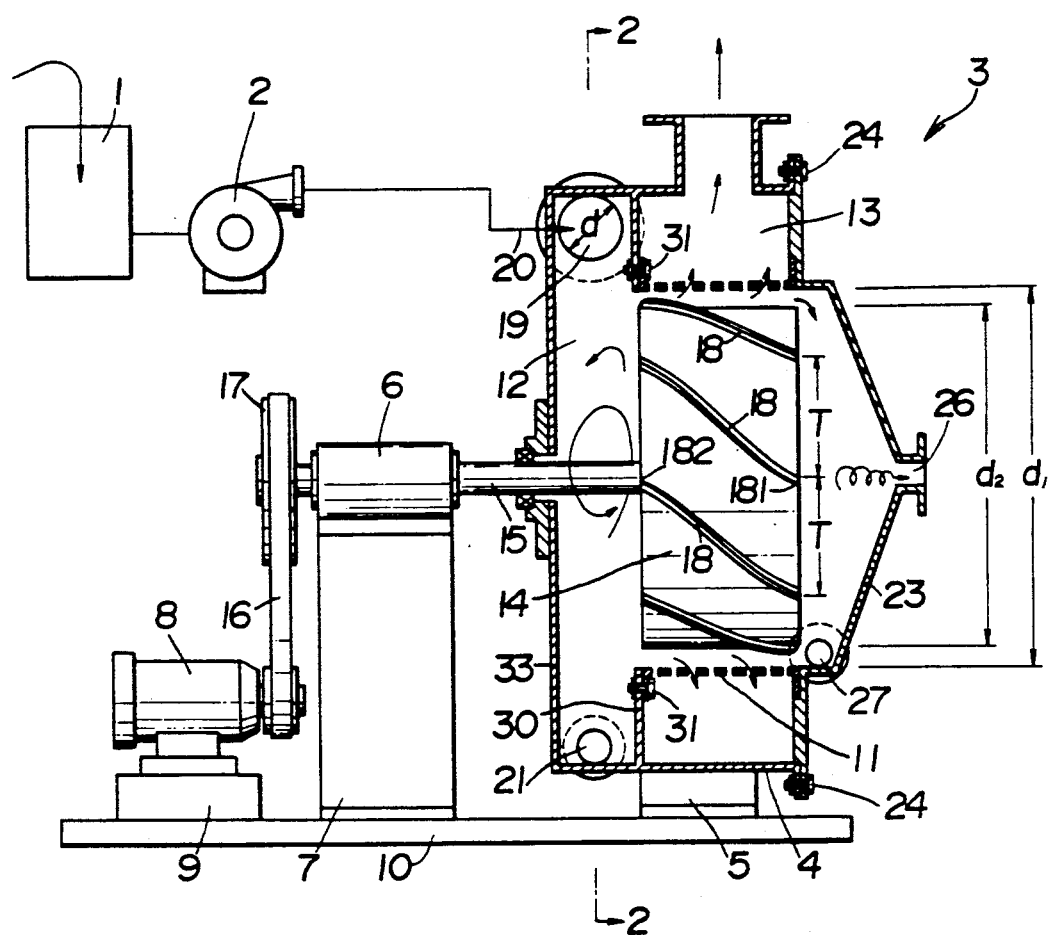
FIG. 1 is a vertical cross-sectional view, schematically showing an embodiment of a stock screening apparatus according to the present invention.

Referring first to FIG. 1, a tank 1 which contains a stock is connected to a paper screening apparatus 3 through a pump 2 for feeding the stock in the tank 1 to the apparatus 3.

The stock screening apparatus 3 has a tank 4 which is mounted on a base 10 through a first mounting base 5. On the base 10 are also disposed a second mounting base 7 which mounts a bearing 6 and a third mounting base 9 which mounts a motor 8.

The tank 4 is divided into a primary chamber 12 and a secondary chamber 13 by a drum-shaped plate screen 11. The drum-shaped plate screen 11 is fixed to a partitioning wall 30 by means of bolts 31.

A drum-shaped rotary body 14 for rotating a material is disposed inside of the drum-shaped plate screen 11 in such a manner as to be coaxial with respect to the plate screen 11. The drum-shaped rotary body 14 has a rotary shaft 15 which extends horizontally. The material which is supplied to the primary chamber 12 is circulated by the drum-shaped rotary body 14.

The rotary shaft 15 is rotated by the motor 8 through a belt 16 and a pulley 17.

The drum-shaped rotary body 14 has a diameter larger than its depth. A plurality of blades 18 is provided on the outer periphery of the rotary body 14 slantingly at a predetermined pitch of T.

The blades 18 are provided such that the end of one blade (e.g., a blade 181) corresponds to the beginning of a subsequent blade (a blade 182).

Thus, a fixed force is given to the stock which passes through the drum-shaped plate screen 11, and pulsation in the flow of the stock is thereby eliminated.

The drum-shaped rotary body 14 is disposed such that its outer peripheral surface is opposed to the drum-shaped plate screen 11.

The drum-shaped plate screen 11 may be the one which is disposed in Japanese Patent Publication No. 16959/1989. In this plate screen 11, slits are formed at intervals of 20 mm to 25 mm such that they cover the outer periphery of the drum-shaped rotary body 14.

The area S1 of the gap between the drum-shaped rotary body 14 and the drum-shaped plate screen 11 (given by $S1 = \frac{1}{4}\pi d1^2 - \frac{1}{4}\pi d2^2$, where d1 is the inner diameter of the drum-shaped plate screen 11 and d2 is the outer diameter of the drum-shaped rotary body 14) and the area S2 of a material supply port 19 (given by $S2 = \frac{1}{4}\pi d2$, where d is the diameter of the material supply port 19) have a relation expressed by $S1 \approx S2$ (preferably, expressed by $S1 = S2$). The drum-shaped rotary body 14 has a diameter larger than its depth.

In this way, resistance of the blade (stirring blade) is reduced, and the energy required by the stock screening apparatus 3 is thereby conserved.

The portion of the primary chamber 12 located upstream of the drum-shaped rotary body 14 has a cylindrical form whose diameter is larger than that of the drum-shaped rotary body 14. A material supply port 19 and a first discharge port 21 are formed in tangential direction of the circle of the cylindrical form. The material supply port 19 communicates with a material supply passage 20, and the first discharge port 21 communicates with a first discharge passage 22.

Figure 2:
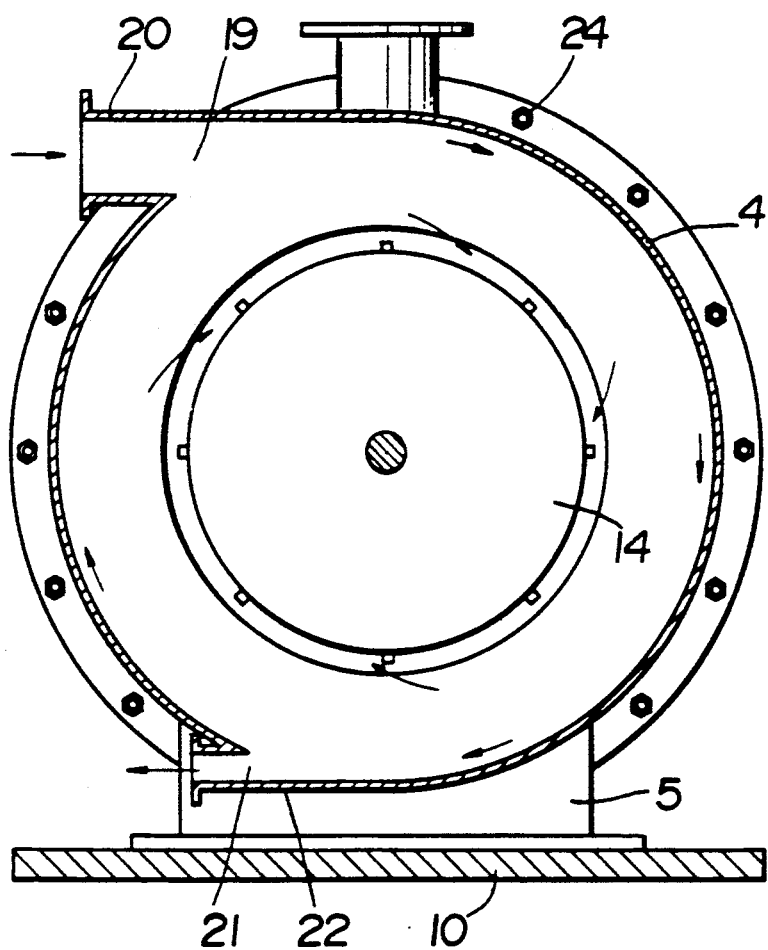
FIG. 2 is a section view taken along the line 2—2 of FIG. 1.
Figure 3:
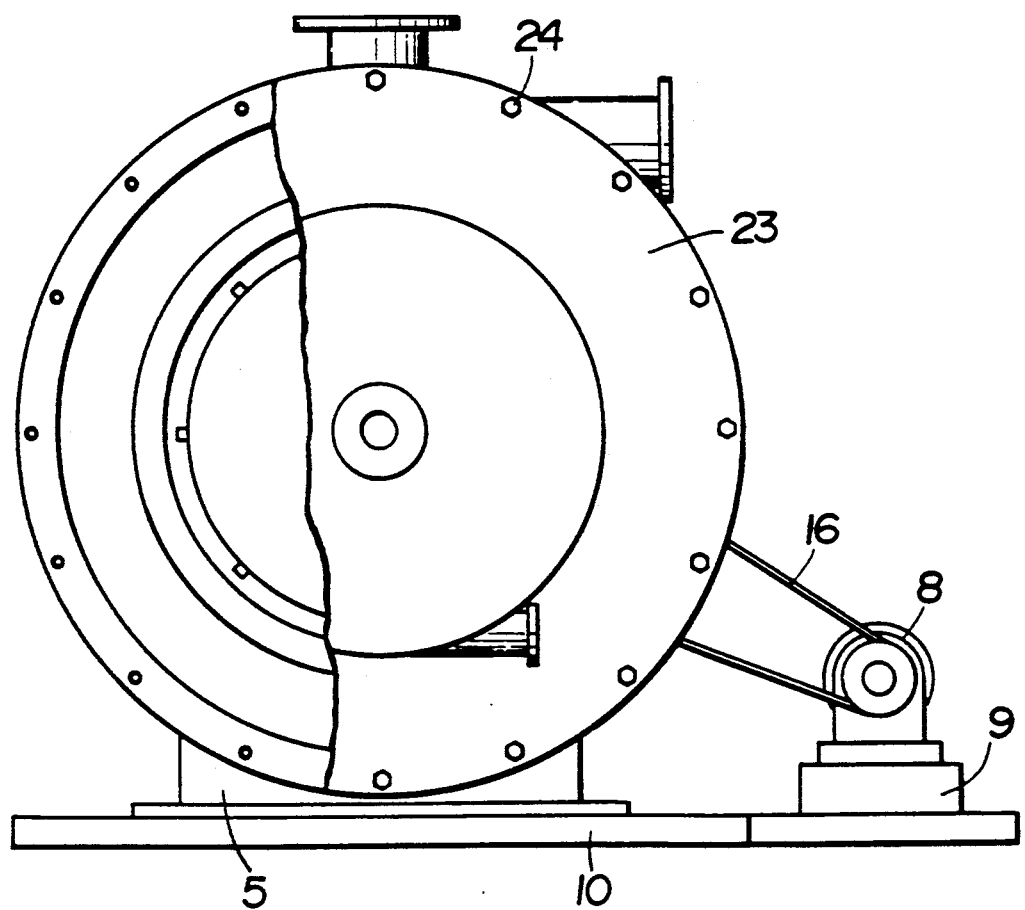
FIG. 3 is a side elevational view of the stock screening apparatus of FIG. 1.
Figure 4:
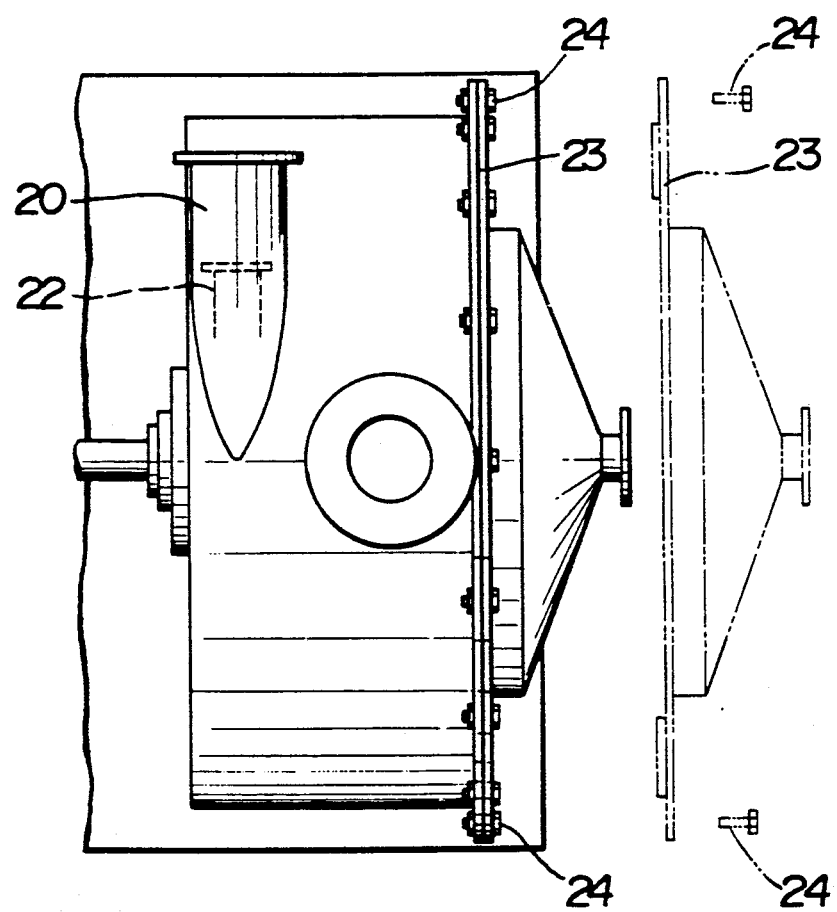
FIG. 4 is a plan view of the stock screening apparatus of FIG. 1, showing a opening of a cover.
Figure 5:
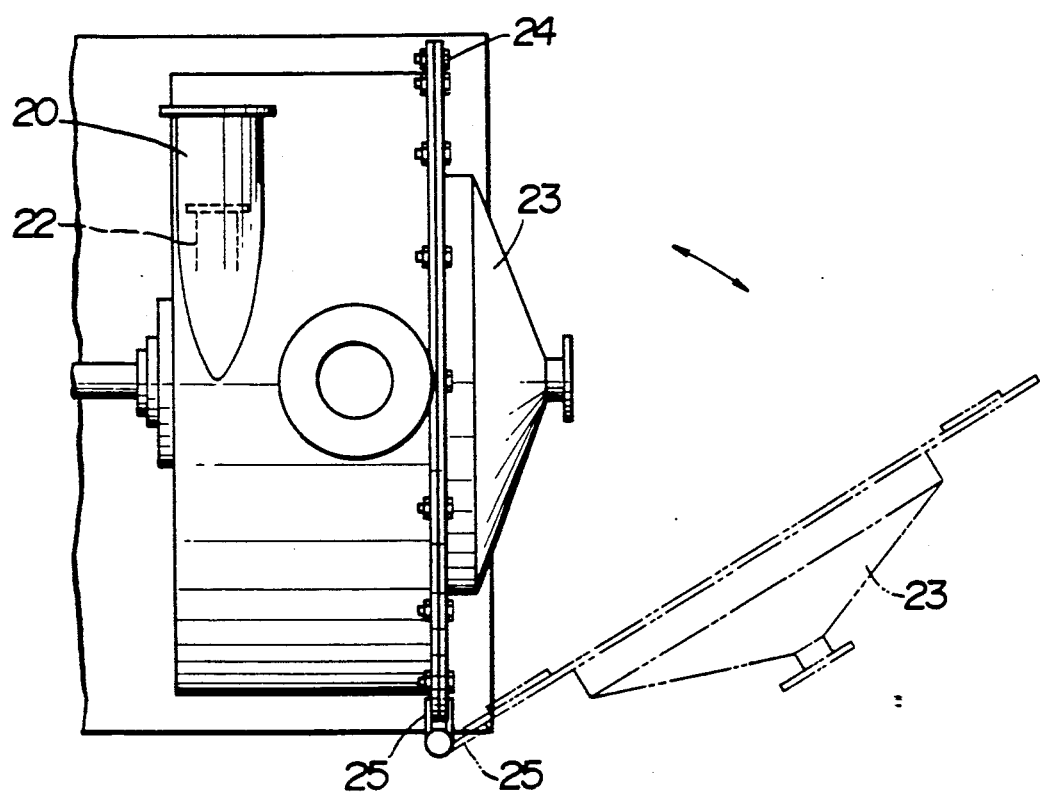
FIG. 5 is a plan view of the stock screening apparatus of FIG. 1, showing modification of the opening of the cover.

The material supply passage 20 which communicates with the material supply port 19 and the first discharge passage 22 which communicates with the first discharge port 21 are disposed in a vertical plane such that the first discharge passage 22 is located at a position where the material supply passage 20 is imaginarily projected downwardly (see FIGS. 2, 4 and 5).

Consequently, the stock, which flows into the primary chamber 12 in a tangential direction from the material supply port 19, flows in vortex in the portion of the primary chamber 12 which is located upstream of the rotary body 14.

Although it is desirable that the material supply passage 20 which communicates with the material supply port 19 and the first discharge passage 22 which communicates with the first discharge port 21 are aligned in a vertical plane such that the first discharge passage 22 is located at a position where the material supply passage 20 is imaginarily projected downwardly, the material supply passage 20 which communicates with the material supply port 19 and the first discharge passage 22 which communicates with the first discharge port 21 may also be disposed in a vertical plane such that a part of the first discharge passage 22 is located at a position where the material supply passage 20 is imaginarily projected downwardly. Relatively heavy foreign materials, such as stones or metals, are fed in a swirl along the periphery of the primary chamber and are discharged from the first discharge port 21 which communicates with the first discharge passage 22 when they are moved downward.

A casing 33 which forms a portion of the primary chamber 12 located upstream of the drum-shaped rotary body 14 is positioned on the driven side of the drum-shaped rotary body 14. An opening of the primary chamber 12 which is located on a side of the drum-shaped rotary body 14 remote from the casing 33 and downstream of the drum-shaped rotary body 14 and an opening of the secondary chamber 13 are closed by a cover 23.

The cover 23 is detachably mounted on the body of the stock screening apparatus 3 by means of fixing means such as bolts 24 (see FIGS. 1 to 4).

A hinge 25 may be used in place of the bolt 24 to pivotally mount the cover 23, as shown in FIG. 5.

The cover 23 is located in the primary chamber 12 downstream of the drum-shaped rotary body 14. The cover 23 has a second discharge port 26 through which light foreign materials are discharged at a position where it faces the center of the drum-shaped rotary body 14, and a third discharge port 27 through which heavy foreign materials are discharged at a position far from the center of the drum-shaped rotary body 14.

The cover 23 is a one-piece cover which closes the opening of the primary chamber 12 and the opening of the secondary chamber 13 as one unit. However, the cover 23 may be of a two-part type which closes the opening of the primary chamber 12 and that of the secondary chamber 13 separately.

Consequently, the stock stored in the tank 1 passes through the material supply passage 20 and is then fed into the interior of the primary chamber 12 from the material supply port 19 by the pump 2.

The stock, which flows into the primary chamber 12 from the material supply port 19 in a tangential direction, flows in a vortex in the portion of the primary chamber 12 located upstream of the drum-shaped rotary body 14, during which the relatively heavy foreign materials, such as stones or metals, swirl along the outer periphery of the vortex.

Thus, the relatively heavy foreign materials, such as metals, are discharged from the first discharge port 21 through the first discharge passage 22.

Hence, flow of the foreign materials, such as stones or metals, into the gap between the drum-shaped rotary body 14 and the drum-shaped plate screen 11 is eliminated.

The drum-shaped rotary body 14 located in the primary chamber 12 rotates at a high speed (ranging from 25 to 30 mm/sec) along the inner peripheral surface of the drum-shaped plate screen 11, so the blade 18 generates cavitation waves and thereby continuously prevents clogging of the drum-shaped plate screen 11.

A pulsating flow of the stock is prevented by giving a fixed force by the blade 18 to the stock which passes through the drum-shaped plate screen 11 and by synchronizing the blade passing period with passing of the stock through the drum-shaped plate screen 11.

The useful fiber passes through the drum-shaped plate screen 11, and an accepted stock is thereby obtained. The relatively light foreign materials which that cannot be removed on the upstream side of the drum-shaped rotary body 14 are discharged from the second discharge port 26, and the relatively heavy foreign materials which cannot be removed on the upstream side of the drum-shaped rotary body 14 are discharged from the third discharge port 27.

That is, in the stock screening apparatus arranged in the manner described above, since the first foreign materials discharge passage which communicates with the first discharge port is located at a position where the material supply passage which communicates with the material supply port is imaginarily projected downwardly, the stock which flows into the primary chamber swirls along the periphery of the chamber, and the foreign materials contained in this vortex, such as stones or metals, are thus discharged through the first discharge passage when they are moved to the first discharge port.

Also, since the opening of the portion of the primary chamber located downstream of the drum-shaped rotary body and the opening of the secondary chamber are closed by the cover, the opening of the portion of the primary chamber located downstream of the rotary body and the opening of the secondary chamber are opened by removing the cover.

Furthermore, the relatively light foreign materials located on the downstream side of the drum-shaped rotary body are discharged from the second discharge port, and the relative heavy foreign materials located on the downstream side of the drum-shaped rotary body are discharged from the third discharge port.

As will be understood from the foregoing description, according to the present invention, the rotary body of the drum-shaped rotary body is disposed horizontally. The portion of the primary chamber located upstream of the drum-shaped rotary body has a cylindrical form, and a material supply port and a first discharge port are provided in a tangential direction of the circle of the cylindrical form. The material supply port communicates with the material supply passage, and the first discharge port communicates with the first discharge passage. The entirety or part of the first discharge passage which communicates with the first discharge port is located at a position where the material supply passage which communicates with the material supply port is imaginarily projected downwardly. In consequence, the stock screening apparatus can be made small in size. Furthermore, the stock which flows into the primary chamber flows in a vortex along the periphery of the primary chamber, and the foreign materials contained in this vortex, such as stones or metals, can thus be discharged through the first discharge passage when they are moved to the first discharge port.

Also, according to the present invention, the rotary shaft of the drum-shaped rotary body is disposed horizontally. The casing which forms the portion of the primary chamber located upstream of the drum-shaped rotary body is positioned on the driven side of the drum-shaped rotary body, and the opening of the portion of the primary chamber which is located on the side of the drum-shaped rotary body remote from the casing and downstream of the rotary body and the opening of the secondary chamber are closed by the cover. In consequence, the opening of the portion of the primary chamber located downstream of the drum-shaped rotary body and that of the secondary chamber can be opened by removing the cover. As a result, maintenance of the apparatus, such as washing with water, can be easily performed without removing the plate screen and without requiring large scale equipment.

What is claimed is:

1. A stock screening apparatus for removing foreign materials from stock, comprising:

a tank having a primary chamber and a secondary chamber therein, said tank being formed of a curved outer wall, a side wall attached to the curved outer wall, and a cover situated at a side opposite to the side wall and openably attached to the curved outer wall, said primary and secondary chambers being opened when the cover is opened, a cylindrical screen plate situated inside the tank to extend from a portion adjacent the cover to a middle of the tank so that the secondary chamber is defined between the curved outer wall and the screen plate, a cylindrical rotary body horizontally situated inside the cylindrical screen plate, said rotary body having a shaft extending through the side wall so that the rotary body is rotated by rotation of the shaft, a material supply port tangentially attached to the curved outer wall to supply the stock in the primary chamber, a first discharge port tangentially attached to the curved outer wall away from the material supply port so that heavy foreign materials contained in the stock and supplied to the tank flows along the curved outer wall and enters into the first discharge port, a second discharge port situated in the center of the cover for removing light foreign materials contained in the stock, and a third discharge port situated in the cover radially away from the second discharge port for removing relatively heavy foreign materials contained in the stock so that the heavy foreign materials are removed immediately at the primary chamber and the light and relatively heavy foreign materials are removed after passing through a space between the screen plate and the rotary body.

2. A stock screening apparatus according to claim 1, wherein said cover includes an outer portion for closing the secondary chamber and a central portion in the form of a conical shape to extend outwardly from the outer portion, the tank being opened for maintenance when the cover is opened.

3. A stock screening apparatus according to claim 2, wherein said third discharge port is located at a portion where the outer portion and the central portion of the cover intersect.

4. A stock screening apparatus according to claim 3, wherein said cover includes a hinge situated between the cover and the curved outer wall to facilitate opening of the cover.

5. A stock screening apparatus according to claim 1, wherein said tank further includes a partitioning wall situated inside the tank for separating the primary chamber from the secondary chamber.

6. A stock screening apparatus according to claim 1, wherein said rotary body has a diameter larger than an axial length thereof.

7. A stock screening apparatus according to claim 6, wherein said rotary body further includes a plurality of blades attached to an outer periphery of the rotary body, said blades slanting at a predetermined pitch.

* * * * *